UNITED STATES PATENT OFFICE.

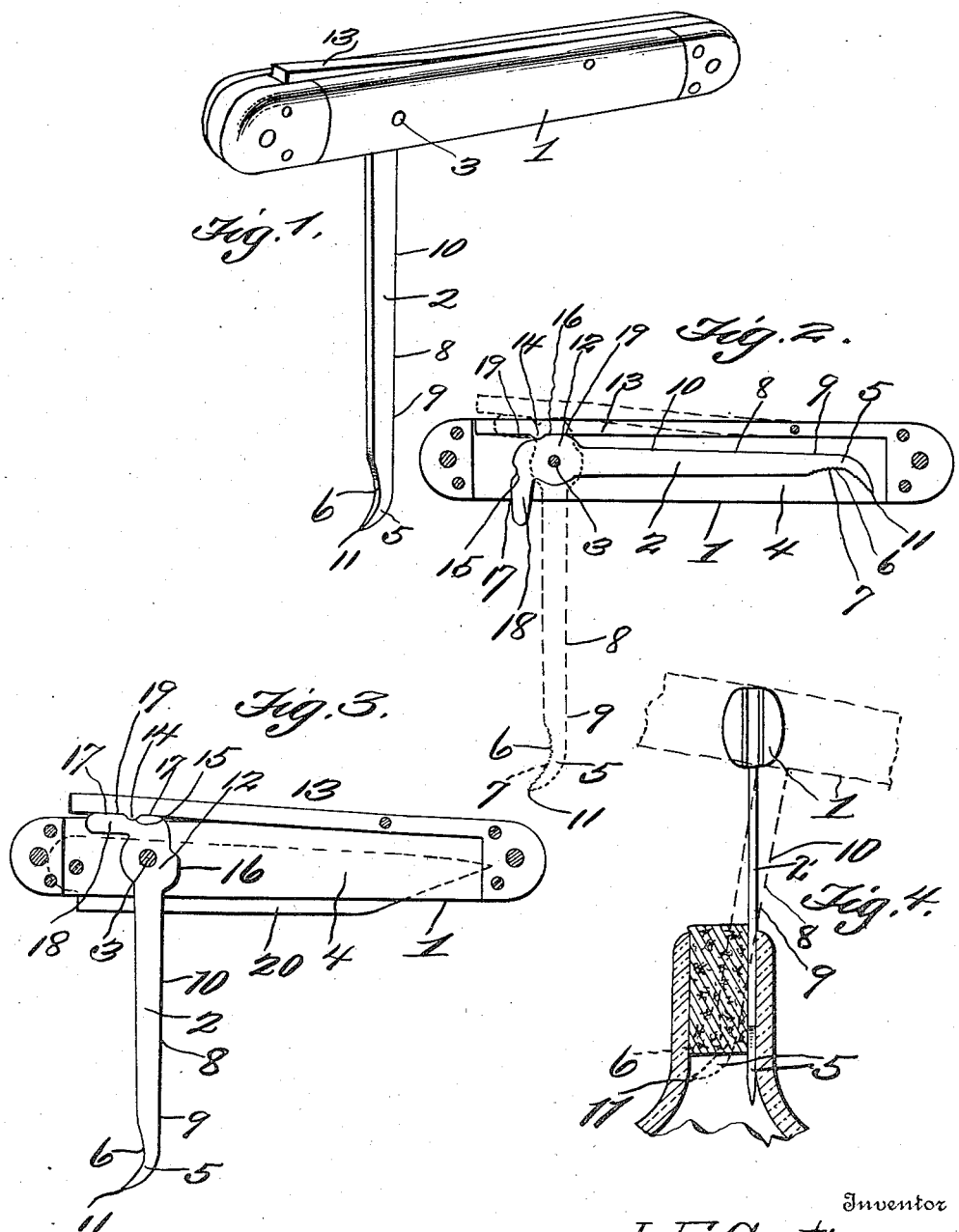

JOHN FRANKLIN CURTIS, OF MACCLENNY, FLORIDA.

CORK-EXTRACTOR.

990,962.　　　　Specification of Letters Patent.　　Patented May 2, 1911.

Application filed December 30, 1910. Serial No. 600,069.

*To all whom it may concern:*

Be it known that I, JOHN FRANKLIN CURTIS, a citizen of the United States, residing at Macclenny, in the county of Baker and State of Florida, have invented a new and useful Cork-Extractor; and I do hereby declare the following to be a full, clear, and exact description of the invention, such as will enable others skilled in the art to which it appertains to make and use the same.

This invention pertains to a new and useful cork extractor, carried by and used in combination with any form of handle, whether a knife handle or any other kind of handle. However, the most convenient form of handle, as shown in the drawing, is that of a knife handle, so that the extractor may be closed within the handle and carried in one's pocket. It is evident, however, that the extractor may be provided with the usual form of rigidly connected handle.

The object of the invention is to provide an improved device of this design, including means whereby the extractor may be thrown at right angles of its handle, so that the extractor may be ready for use. When thrown at right angles to its handle there is provided novel means for holding the same securely in position.

A further feature of the invention is to so mount the extractor within its handle, when in a closed position, as to hold the same in such a position.

The invention comprises further features and combination of parts hereinafter set forth, shown in the drawings, and claimed.

In the drawings:—Figure 1 is a perspective view, showing the cork extractor ready for use. Fig. 2 is a longitudinal sectional view through the cork extractor, showing the cork extractor in a closed position. Fig. 3 is a view similar to Fig. 2 showing the extractor in an open position. Fig. 4 is a view of a portion of a bottle showing the extractor in a position ready to extract the cork.

Referring to the annexed drawings, 1 designates the handle, which may be of any suitable construction, whether plain or in the form of a knife handle. However, at the present status of the case the knife handle is thought at the present time to be the most convenient form of handle, and pivoted therein is the cork extractor shank 2. The pivot 3 of the cork extractor is located preferably nearer one end of the handle than the other. The shank 2 of the cork extractor when in a closed position with relation to the handle is received within an elongated space 4 of the handle. The shank of the cork extractor terminates into a slightly curved hooked end 5, the edge or side 6 of which, may or may not be provided with serrations 7 as shown in Figs. 1 and 2. If the edge or side is provided with serrations, one may more easily extract a cork from a bottle.

The side 8 is provided with a cutting edge 9, which finally disappears at a point along the shank 2 of the extractor as indicated at 10. This cutting edge, however, extends to the extreme point of the curved hooked end 5 of the extractor, as shown at 11.

When it is desired to extract the cork from a bottle the extractor is thrown at right angles to the handle, then it is inserted into the neck of the bottle adjacent the inner circumference of the neck and the outer circumference of the cork, until the curved hooked end is below the bottom of the cork. When the extractor has reached this position, as shown in full lines in Fig. 4, the extractor is partially rotated until the curved hooked end of the shank is positioned below the lower end of the cork, after which a pulling action is imparted to the extractor, thus permitting the cork to be withdrawn from the bottle.

The other end portion of the extractor terminates into an enlargement 12, through which the pivot 3 transversely extends. Engaging the enlargement is the usual form of spring 13, which is provided with a projection 14 designed to enter the recess 15 of the enlargement. It will be observed that the pivot 3 is disposed a greater distance from the recess 15 than from the side 16 of the enlargement. By disposing the pivot 3 in this manner the spring 13 tends to hold the extractor in a closed position as shown in Fig. 2. However, when the extractor is thrown in a position as shown in Fig. 3 the flat portion 17 of the extension 18 of the enlargement contacts with the side 19 of the spring 13, thus tending to hold the extractor at right angles to the handle. When the extractor is so disposed the projection 14 enters the recess 15, which further assists in holding the extractor in its proper position. The extension 18 extends from the enlargement of the extractor, at right angles to the shank 2, and constitutes means whereby the shank of the extractor may be thrown into an opened position, whereby the extractor may be used. The handle 1, however, may or may not be provided with an additional knife blade 20, as indicated in Fig. 3.

From the foregoing description it will be observed that a novel form of cork extractor, has been devised which has a novel form of handle, whereby the cork extractor may be thrown in a closed position, thus obscuring the same from view, and furthermore permits the same to be carried in one's pocket.

This invention having been set forth, what is claimed as new and useful is:—
A cork extractor, a handle therefor in which said cork extractor is pivoted, said handle having a spring provided with a projection upon one of its faces, said extractor terminating into an enlargement at its pivoted end, said enlargement provided with notches to receive said projection so as to hold the extractor in a closed or open position, said enlargement having a projection extending at right angles to the shank of the extractor, said extension when the extractor is in a closed position constituting means whereby the extractor may be thrown in an open position.

In testimony whereof I have signed my name to this specification in the presence of two subscribing witnesses.

JOHN FRANKLIN CURTIS.

Witnesses:
   JAS. D. CHALKER,
   G. M. CLAYTON.